United States Patent [19]

Hale et al.

[11] Patent Number: 5,572,349

[45] Date of Patent: Nov. 5, 1996

[54] COMMUNICATIONS SYSTEM

[75] Inventors: Michael A. Hale; Donald E. A. Clarke, both of Essex, England

[73] Assignee: British Telecommunications public limited company, Great Britain

[21] Appl. No.: 371,550

[22] Filed: Jan. 11, 1995

Related U.S. Application Data

[63] Continuation-in-part of Ser. No. 194,081, filed as PCT/GB94/02744, Dec. 15, 1994.

[30] Foreign Application Priority Data

Dec. 15, 1993 [GB] Great Britain ................... 9325697

[51] Int. Cl.⁶ ..................................... H04J 14/08
[52] U.S. Cl. ................. 359/137; 359/167; 359/158; 370/112
[58] Field of Search ........................ 359/135, 158, 359/136, 137–138, 167–168; 370/112

[56] References Cited

U.S. PATENT DOCUMENTS

| 4,441,180 | 4/1984 | Schussler | 389/135 |
| 4,567,586 | 1/1986 | Koeck | 319/138 |
| 4,631,720 | 12/1986 | Koeck | 370/84 |
| 5,398,129 | 3/1995 | Reimann | 359/167 |
| 9,341,365 | 5/1994 | Clarke | 359/135 |

FOREIGN PATENT DOCUMENTS

| 0020878 | 1/1981 | European Pat. Off. . |
| 0054120 | 6/1982 | European Pat. Off. . |
| 0425871A2 | 5/1991 | European Pat. Off. . |
| WO89/05077 | 11/1988 | WIPO . |

OTHER PUBLICATIONS

Cook et al, "Broadband Digital Transmission Over Passive Optical Networks", GLOBECOM '91, vol. 1, 2 Dec. 1991, Phoenix, US, pp. 597–601.

Merk et al, "CATV Distribution in a Fiber–in–the–Loop System Utilizing External Modulation", *42nd Annual Conventiona nd Exposition of the National Cable Television Association*, 6 Jun. 1993, San Francisco, US, pp. 368–375.

*Primary Examiner*—Leo Boudreau
*Assistant Examiner*—Kinfe-Michael Negash
*Attorney, Agent, or Firm*—Nixon & Vanderhye P.C.

[57] ABSTRACT

A communications system having a line terminal(1), a plurality of customer terminals (2), and a passive optical network for supporting traffic between the line terminal and the customer terminals. The line terminal(I) has a terminal unit (BTS(n)) for relatively narrow bandwidth traffic, and a second terminal unit (BTS(1) to BTS(n-1)) for relatively wider bandwidth traffic. A time domain multiplexer (14) is arranged to multiplex the traffic from the first and second terminal unit for downstream transmission over the network (18). Each customer terminal (2) has a first service unit for relatively narrow bandwidth traffic and a second service unit for relatively wider bandwidth traffic. Each customer terminal (2) has a demultiplexer (22) arranged to receive multiplexed downstream traffic from the network (18), and to segregate the traffic between the first and second service unit. Each customer terminal (2) has control elements for generating relatively narrow bandwidth control signals for upstream transmission over the network, the second terminal unit (BTS(1) to BTS(n-1)) of the line terminal (1) being responsive to the control signals from a given customer terminal (2) to control the transmission of the relatively wider bandwidth traffic to that customer terminal. The downstream transmission is by TDM and the upstream transmission is by TDMA.

14 Claims, 5 Drawing Sheets

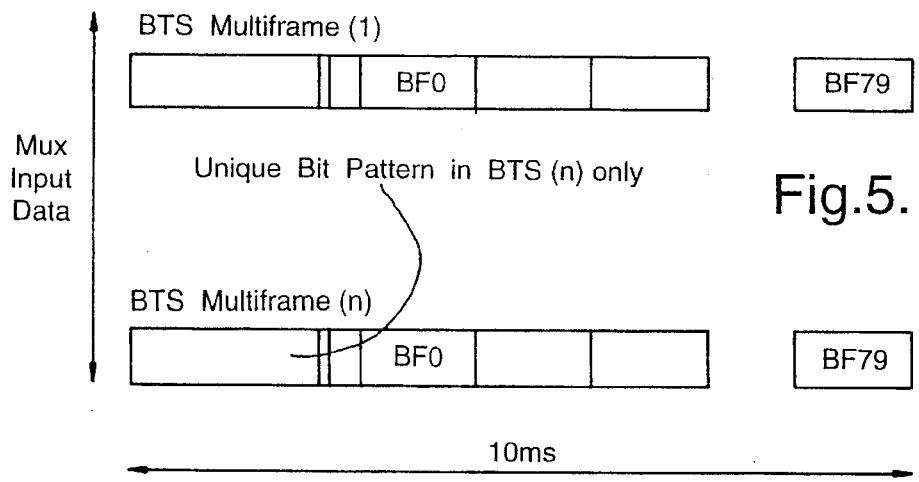
Fig.5.    BTS Superframe Generation
Fig.5.(a)
Fig.5.(b)
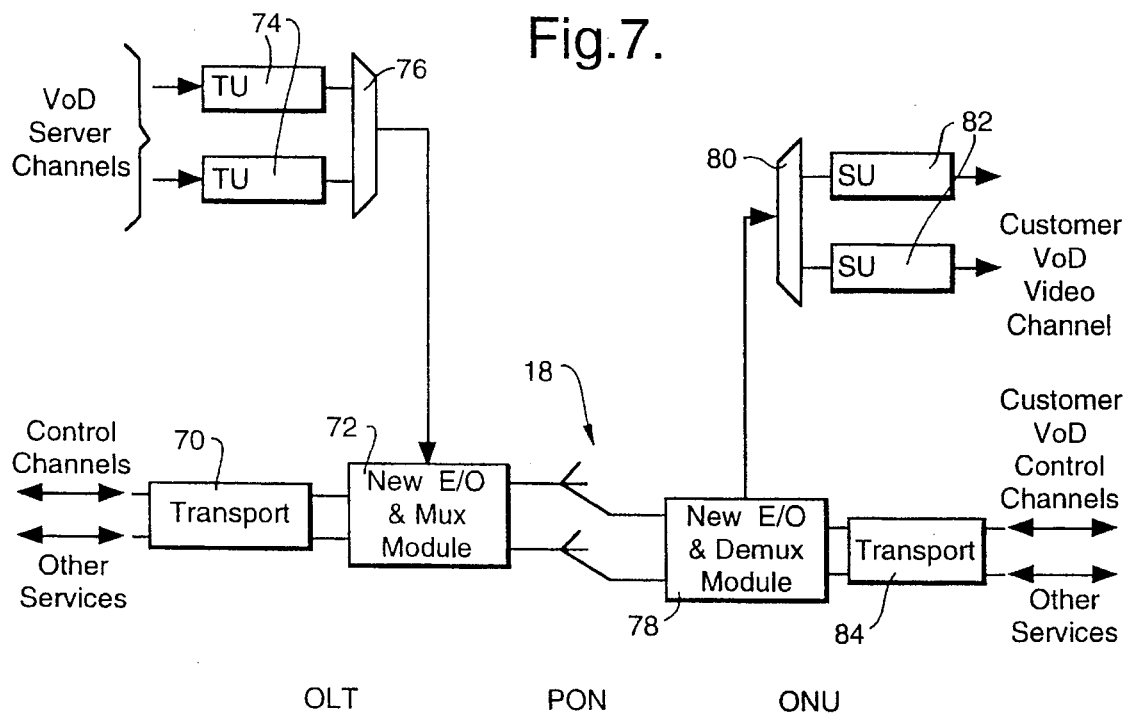
Fig.7.

COMMUNICATIONS SYSTEM

This application is a continuation-in-part of our copending commonly assigned application Ser. No. 08/194,081, filed as PCT/GB94/02744, Dec. 15, 1994.

FIELD OF THE INVENTION

This invention relates to a communications system, and to a line terminal and a customer terminal therefor.

BACKGROUND OF THE INVENTION

A known optical fibre communications network is the passive optical network (PON) which is used to support voice and data traffic—so-called telephony over a passive optical network (TPON). Managing the movement of traffic through a TPON involves a number of technical considerations.

TPON systems currently are designed to carry a range of voice/data services. At the time these were specified, it was assumed that any expansion of such systems to include video would be a long way into the future for regulatory reasons. The systems were, therefore, specified to allow the use of a second wavelength for broadband services on the PON at a later date, without impinging on existing systems.

The present assignee has developed a bit transport system (BTS) for use in a TPON. In this bit transport, system, an optical line terminal (OLT) at an exchange transmits bit interleaved time division multiplex (TDM) frames downstream to all the receiving terminations on the network, known as optical network units (ONUs). The transmitted frames include both traffic data and control data. Each termination recognises, and responds to, appropriately-addressed portions of the data in the transmitted frames, and ignores the remainder of the frames.

In the upstream direction, each termination transmits data in a predetermined time slot, and the data from the different terminations are assembled at the OLT into time division multiple access (TDMA) frames of predetermined format.

One feature necessary to such a network is the provision of compensation for the differing delays associated with the different distances of the various terminations from the OLT. To this end, in the BTS system, each termination is arranged to transmit a ranging pulse timed to arrive in a predetermined portion of the upstream TDMA frame. The OLT is arranged to monitor the timing and phase of the arrival of the ranging pulse from each of the terminations, and to return a servo-control signal to each termination to adjust the launch power of that termination, and to retard or advance its transmissions as appropriate. This active fine ranging enables the BTS to ensure the stability of the upstream TDMA frame and, for example, to compensate for fluctuations in timing due to such effects as changes in the operating temperature of the network. However, this places severe demands on the design of the OLT, requiring the measurement of the timing of received signals to within a fraction of a clock cycle in real-time.

Additionally, the BTS must respond to commands from the next level in the network management hierarchy to allocate traffic circuits and to handle the addition/deletion of subscribers and the change/reallocation of numbers (known as "churn"). In practice, BTS controllers have no intrinsic knowledge of the type of traffic to be transmitted from an exchange (or its format), or the bandwidth which should be allocated to a particular network customer termination; it is up to the network management hierarchy to provide the BTS with all the data necessary to enable it to map the appropriate number of traffic bits to a specified circuit.

Currently, the BTS is designed to be substantially symmetrical. Bandwidth configured in the downstream direction is also available in the upstream direction.

In summary, the BTS is a transport system which allows the bandwidth from an OLT to be distributed flexibly between a number of remote customer ONUs sharing a common point-to-multipoint passive split optical network. In current TPON systems, four BTS master units at the OLT are connected, via a time switch, to tributary units (TUs) which enables any 64k timeslot from any 2048 Kbit/s TU to be mapped to any timeslot on a particular BTS master unit. The BTS slave in the ONU distributes the TPON bandwidth to service units (SUs) which deliver the individual 64k timeslots to the customer for any given service.

The concept of video-on-demand (VoD) has recently been proposed. When using VoD, a subscriber to the service would be able to call up a video transmission from a library of titles as and when the subscriber wanted to, and to manipulate the video information, for example by freezing on a particular frame and fast searching backwards and forwards.

Now that video compression techniques have been developed, requiring 2 Mbit/s or less per customer channel, the possibility of distributing video channels among customers is feasible, without the need for higher bandwidth transmission systems than are currently available.

SUMMARY OF THE INVENTION

The present invention provides a communications system comprising an OLT, a plurality of ONUs, and a PON for supporting traffic between the OLT and the ONUs, the OLT having a first terminal unit means for relatively narrow bandwidth traffic, a second terminal unit means for relatively wider bandwidth traffic, and a time domain multiplexer arranged to multiplex the traffic from the first and second terminal unit means for downstream transmission over the PON, each ONU having a first service unit means for relatively narrow bandwidth traffic, a second service unit means for relatively wider bandwidth traffic, a demultiplexer arranged to receive multiplexed downstream traffic from the PON and to segregate the traffic between the first and second service unit means, and control means for generating relatively narrow bandwidth control signals for upstream transmission over the PON, the second terminal unit means of the OLT being responsive to the control signals from a given ONU to control the transmission of the relatively wider bandwidth traffic to that ONU, wherein the downstream transmission is by TDM and the upstream transmission is by TDMA.

The invention is applicable to VoD for the wider bandwidth traffic. However, other wide bandwidth traffic can equally well be transmitted. In general, the system of the invention is suited to interactive information systems. For example, educational video, data and voice services can be transmitted by a system according to the invention. While the information traffic in these systems is likely to be inherently unbalanced, the system of the invention can equally well be used to support wide bandwidth traffic of a substantially more balanced nature.

Advantageously, the first service unit means includes the control means.

In a preferred embodiment, the first terminal unit means is a BTS master unit, and the first service unit means is a corresponding BTS slave unit. In this case, the second terminal unit means may be constituted by a plurality of BTS master units, and the second service unit means is constituted by a BTS slave unit.

Alternatively, the second terminal unit means is constituted by a plurality of TUs, and the OLT further comprises a second time domain multiplexer operable to multiplex together the traffic from the TUs. Conveniently, the second service unit means of each ONU is constituted by a plurality of service units, and each ONU further comprises a second demultiplexer operable to demultiplex the segregated traffic for the service units of the second service unit means of that ONU.

In another preferred embodiment, the first terminal unit means is constituted by a plurality of BTS master units, a plurality of first TUs, and a time slot interchanger connecting the first TUs to the BTS master units. Advantageously, the second terminal unit means is constituted by a plurality of second TUs, a predetermined number of the second TUs being associated with each of the BTS master units. Preferably, a respective time domain multiplexer is operable to multiplex together the traffic from the TUs associated with each of the BTS master units. Each ONU may be provided with a BTS slave unit which is associated with first and second groups of service units constituting the first and second service unit means of that ONU. Conveniently, one of the service units of the first group of service units of each ONU includes the control means.

Preferably, the second terminal unit means of the OLT is arranged to provide video information such as VoD information.

The invention also provides an OLT for a communications system including a plurality of ONUs and a PON for supporting traffic between the OLT and the ONUs, the OLT comprising a first terminal unit means for relatively narrow bandwidth traffic, a second terminal unit means for relatively wider bandwidth traffic, a time domain multiplexer for multiplexing the traffic from the first and second terminal unit means for downstream TDM transmission, receiver means for receiving TDMA signals from the ONUs and for separating control signals transmitted by the ONUs from traffic transmitted by the ONus, and means for directing received control signals to the second terminal unit means thereby to control the transmission of the relatively wider bandwidth traffic to the ONUs.

The invention further provides an ONU for a communications system including an OLT, a plurality of other ONUs, and a PON for supporting traffic between the OLT and the ONUs, the ONU comprising a first service unit means for relatively narrow bandwidth traffic, a second service unit means for relatively wider bandwidth traffic, a demultiplexer arranged to receive time domain multiplexed traffic, to demultiplex said traffic, and to segregate the traffic between the first and second service unit means, and control means associated with the first service unit means, the control means being operable to generate a relatively narrow bandwidth control signal for upstream TDMA transmission over the system to control the downstream transmission of the relatively wider bandwidth traffic.

The invention still further provides a method of operating a communications network comprising an OLT, a plurality of ONUs, and a PON for supporting traffic between the OLT and the ONUs, the method comprising the steps of time domain multiplexing, at the OLT, relatively narrow bandwidth traffic from a first terminal unit means and relatively wider bandwidth traffic from a second terminal unit means, transmitting the multiplexed traffic downstream over the PON, segregating the relatively narrow and wider bandwidth traffic respectively between first and second service unit means at the ONUs and transmitting relatively narrow bandwidth control signals from the first service unit means upstream to the OLT from each of the ONUs, the second terminal unit means being responsive to the control signals to control the transmission of the relatively wider bandwidth traffic to the second service unit means, wherein the downstream transmission is by TDM and the upstream transmission is by TDMA.

BRIEF DESCRIPTION OF THE DRAWINGS

The present invention can be put into practice in various ways, some of which will now be described, by way of example, with reference to the accompanying drawings, in which:

FIGS. 5 (*a*) and (*b*) are diagrams of a downstream BTS superframe;

FIG. 7 is a schematic block diagram of a second embodiment of the invention.

DETAILED DESCRIPTION OF THE DRAWINGS

Figure 1:
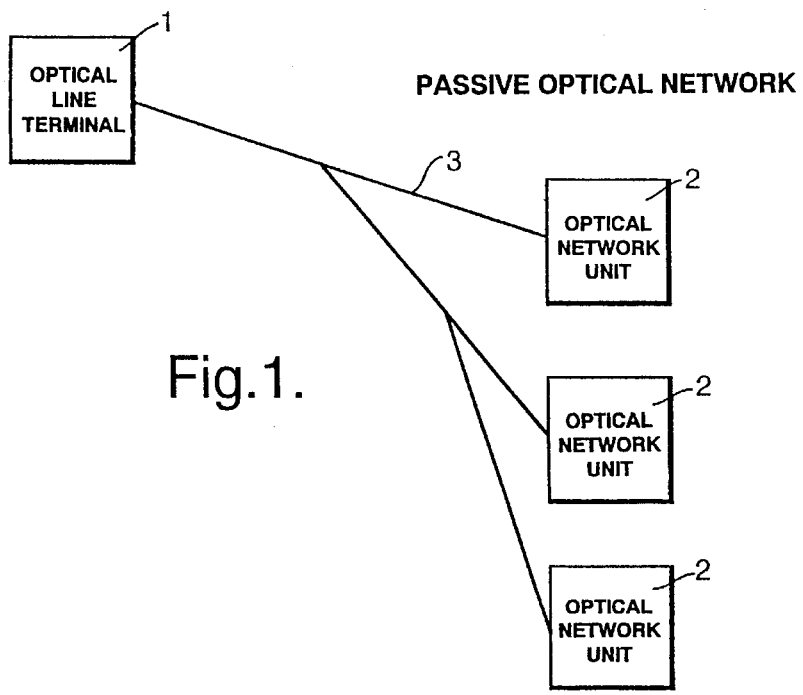
FIG. 1 is a block diagram of a part of a TPON system.

Referring to the drawings, FIG. 1 shows a TPON system comprising an OLT 1, a number of ONUs 2, and a PON 3 linking the OLT to the ONUs. Although, for clarity, only three ONUs 2 are shown, in practice many more will be connected to the OLT 1 via the PON 3. Typically, the OLT 1 is located in a local exchange, and the ONUs 2 are subscriber stations in domestic or commercial premises in the neighbourhood of the local exchange.

Using a BTS, the OLT 1 transmits data over the PON 3 as TDM frames having a predetermined format. The frames include control channels addressed to specific ones of the ONUs 2 to control, amongst other parameters, the amplitude and timing of the optical signals transmitted onto the PON 3 by the ONUs.

In the upstream direction, each ONU 2 transmits data in a predetermined time slot, which data is assembled into a TDMA multiframe at the OLT 1. Since the TPON system is synchronous in operation, it is necessary to control the timing of the ONUs 2 both to compensate for the different delays associated with different positions of the ONUs on the PON 3, and to correct for any variation in the delay arising, for example, from local fluctuations in the temperature of the network.

Figure 2:
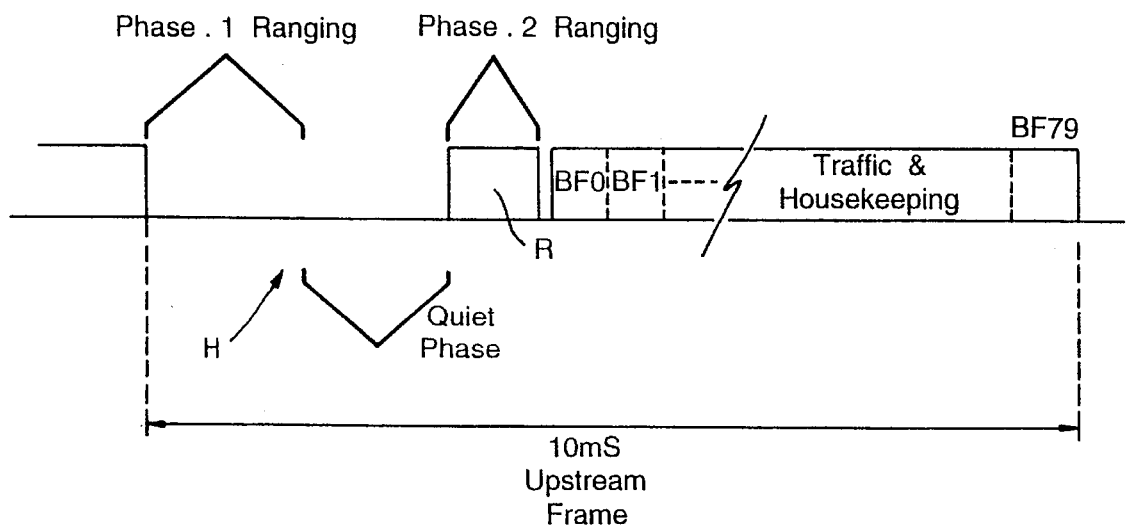
FIG. 2 is a diagram of an upstream BTS frame.

FIG. 2 shows the format of an upstream multiframe. Traffic data is transmitted to the OLT 1 in 80 basic frames BF0 to BF79. The basic frames BF0 to BF79 of the multiframe are preceded by a header H which includes a phase-2 ranging section R which is 720 bits long. Each ONU 2 is arranged to transmit onto the PON 3 a ranging pulse timed to arrive at a predetermined position within the ranging section R. The OLT 1 determines the phase of each arriving ranging pulse, and then transmits control signals to the respective ONU 2 to adjust the launch power of that ONU, and to retard or advance the timing of the transmission from that ONU in order to minimise the phase offset between the received data from that customer terminal and the intended position of that data within the return frame structure.

Figure 3:
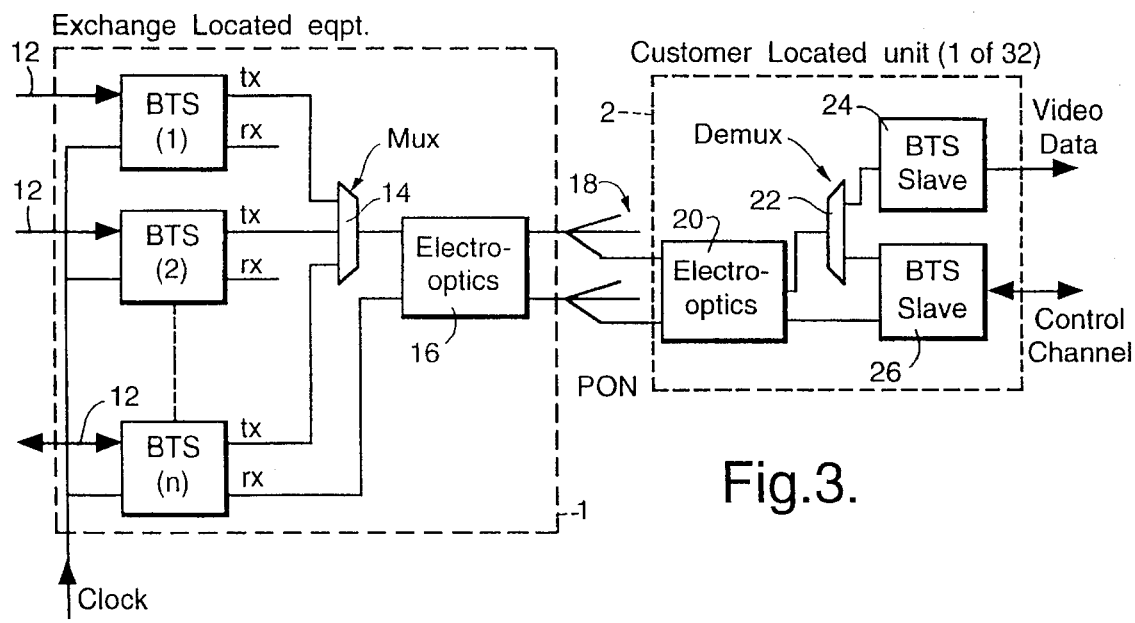
FIG. 3 is a schematic block diagram of a first embodiment of the present invention.

Referring to FIG. 3, a simple implementation of the invention is shown for full duplex operation at 20.48 Mbit/s with overlaid video data. The system comprises a bank of BTS master units BTS(1) to BTS(n) which are located in the OLT 1. Each BTS master unit BTS(1) to BTS(n) has an incoming line 12 carrying the signal to be transmitted over a PON 18 coming from eight data streams. There is also a clock input 13 synchronising the BTS master units BTS(1) to BTS(n) to a common source.

Each BTS master unit BTS(1) to BTS(n) has a transmitting output tx and a receiving input rx. In this embodiment, the BTS master unit BTS(n) is arranged to support relatively narrow bandwidth duplex voice and data traffic. The other BTS master units BTS(1) to BTS(n-1) are arranged to support relatively wider bandwidth asymmetric traffic, such as VoD channels. A narrow bandwidth duplex control channel, associated with the VoD channels, for customer control of the received video information, uses a small proportion (e.g. 8 Kbit/s) of the bandwidth provided by the BTS master unit BTS(n) supporting the narrow bandwidth duplex traffic.

The transmitting outputs tx of the BTS master units BTS(1) to BTS(n) are commonly fed to the inputs of a time division multiplexer 14 which is also located in the OLT 1. The multiplexed output signal is then converted into an optical wavelength signal in an electro-optics converter 16, in which a laser light source having an output wavelength of 1310 nm is amplitude modulated with, for example, pulse code modulated (PCM) traffic signals for transmission across the PON 18. The electro-optics converter 16 is also arranged to convert optical wavelength traffic received from the PON 18 into electrical signals.

An ONU 2 (see FIG. 3) according to the invention comprises an electro-optics converter 20 similar to the electro-optics converter 16 in the OLT 1. The output from the converter 20 is connected to the input to a demultiplexer 2 which distributes the multiplexed signals between two conventional BTS slave units 24 and 26. In this embodiment, the slave unit 24 is a VoD output, this slave unit having an associated customer video channel for relatively broadband video signals. The other BTS slave unit 26 is used for the narrower bandwidth control channel between the video source and the customer. Thus, the narrow bandwidth BTS master unit BTS(n) in the OLT 1 and the slave unit 26 in the ONU 2 communicate via the control channel. It will be appreciated, by the skilled person, that a full network will combine many exchanges and numerous customers. Only one OLT 1 and one ONU 2 are shown in FIG. 3 for the sake of clarity. Each ONU 2 requires a channel for transmitting and receiving control signals associated with the VoD information. This is described above in relation to the narrow bandwidth BTS slave unit 26. However, the same slave unit 26 may service more than one VoD channel for each customer, depending on its capacity.

The skilled person will also be aware that the video signal itself represents a one-way, or severely asymmetrical, flow of traffic from the OLT 1, downstream across the PON 18 and to the video channel at the customer end. Conversely, the control channel represents a two-way, generally symmetrical, flow of traffic between the OLT 1 and the ONU 2. The control channel is specific to a particular customer, and comprises a narrow band full duplex (e.g. 9.6 kbit/s asynchronous) link between the ONU 2 and the OLT 1 in a normal narrower bandwidth voice/data channel. Thus, the control channel data is more normally representative of the bandwidth of the voice/data present on a conventional TPON.

The BTS frame structure is designed to carry traffic arriving at eight 2.352 Mbit/s PCM ports at a BTS master unit. In addition to traffic, bandwidth needs to be allocated for BTS control and ranging. For simplicity, the frame structures in both directions have similar formats but differ in functional detail, e.g. data in the downstream direction is scrambled to facilitate clock recovery at the remote terminations.

The aggregate system baud rate is 20.48 MBaud, and the multiframe frequency is 100 Hz, giving a multi frame period of 10 ms. The conventional BTS is a symmetrical transmission system, with the upstream direction of transmission being more complex than the downstream direction. According to the invention, it is possible to extend this multiplex in a TPON system to provide additional bandwidth in the downstream direction without modifying in any way the more complex upstream TDMA protocol.

Figure 4A:
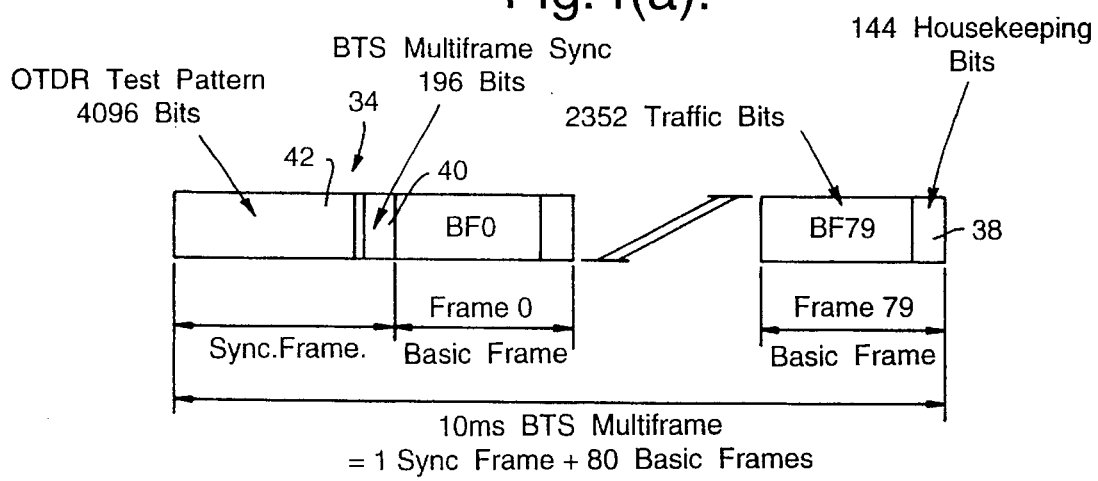
FIGS. 4 (*a*) and (*b*) are diagrams respectively of a downstream BTS multiframe and basic frame.
Figure 4B:
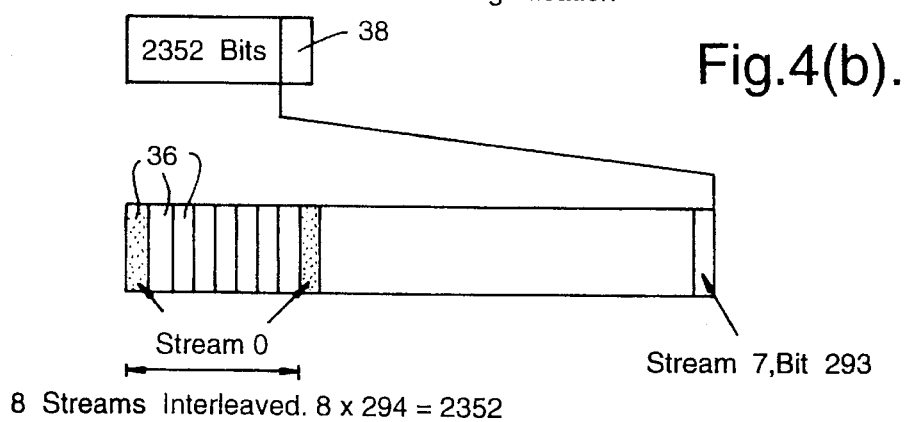

Referring to FIGS. 4(a) and (b), the conventional BTS downstream multi frame repeats every 10 ms. It consists of one sync frame 34 and 80 basic frames BF0 to BF79. Each basic frame BF0 to BF79 contains the channel data from eight 125 μs source frames 36 (provided by the associated data streams) and 144 housekeeping bits 38 (see FIG. 4 (b)). Each source frame contains 294 channel bits.

The 125 μs source frames are rate adapted to interface with the BTS master units BTS(1) to BTS(n), each of which receives the 8×294 bits per 125 μs source frame from its data streams at 2.56 Mbit/s (this includes some redundant bit space). The bit streams are bit interleaved and time compressed (to 20.48 Mbit/s) in the BTS master units BTS(1) to BTS(n). They are then multiplexed in the multiplexer 14 and transmitted over the PON 18. This multiplexing, by a convenient factor (e.g. 2, 4, 8 or more—depending upon the number of BTS master unit BTS(1) to BTS(n)), enables the handling of the increased traffic requirements caused by the presence of the video traffic.

At the customer end, the slave unit 24 is able to retrieve a minimum of one bit per basic frame of the multiframe. Thus, the minimum channel size available from a decompressed 125 μs source frame at the customer end is 8 kbit/s.

The sync frame 34 of the multiframe is subdivided into two main areas: a 196 bit multiframe sync pattern 40 and a 4096 bit optical time domain reflectometry (OTDR) area 42. The OTDR area 42 is not always fully used, if at all, and is, therefore, used for alignment of a superframe for the system according to the invention.

Referring to FIG. 5(a), the input to the multiplexer 14 is a superframe constituted by a sequence of multiframes from the BTS master units BTS(1) to BTS(n).

A superframe incorporating the wider bandwidth traffic of, for example the VoD service, is an enhanced version of the basic BTS downstream multiframe. The superframe can be generated simply by interleaving the bits from the multiframes from the BTS master units BTS(1) to BTS(n). The multi frame from the BTS master unit BTS(n) contains a unique reference pattern in its OTDR area 42 which enables its location within the superframe to be determined at the ONU 2. From this datum position, the positions of the rest of the multiframes can be determined. The bit-interleaved multiframes, making up the superframe from the multiplexer, are shown in FIG. 5 (*b*).

Figure 6:
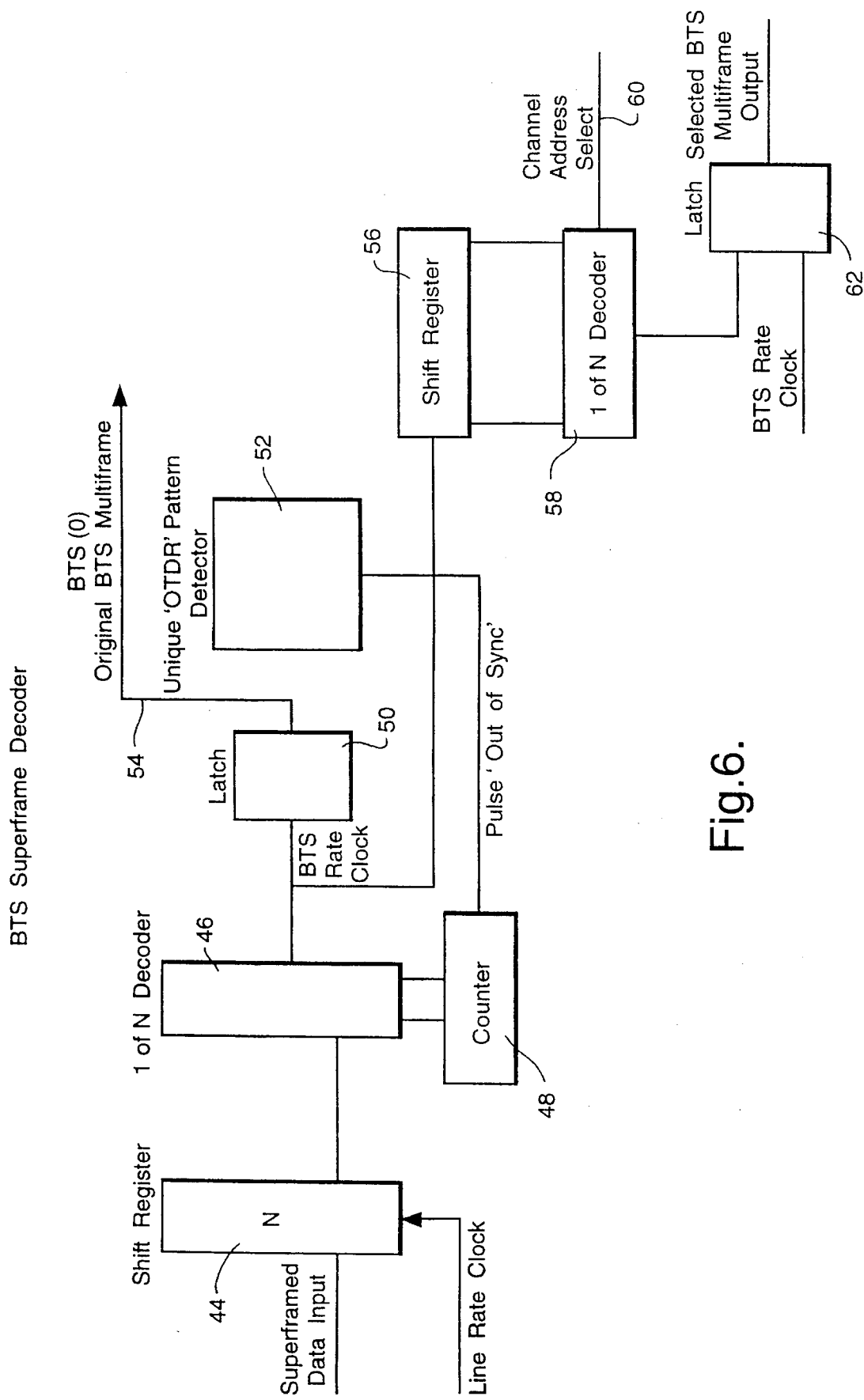
FIG. 6 is a schematic block diagram of a BTS superframe decoder for use in the embodiment of FIG. 3.

Referring to FIG. 6, at the ONU 2, the superframe demultiplexer 22 comprises a length-N shift register 44 which clocks in the superframe data serially at a line clock rate. A 1-of-N decoder 46 is connected to the parallel output of the shift register 44. An output from the shift register 44 is selected, using the 1-of-N decoder 46, according to the value of an input from a counter 48. A latch 50, clocked at the BTS multiframe bit rate, selects one of the multiframes of the BTS master units BTS(1) to BTS(n) in the superframe. The BTS multi frame bit clock rate is the superframe bit clock divided by N. The OTDR pattern in the selected multiframe is compared, by a pattern detector 52, with the unique reference pattern in the OTDR area 42 of the sync frame 34.

An "out of sync." pulse is generated if the pattern detector 52 fails to find the unique reference pattern after a number of multiframe periods. This unique reference pattern is present only in the OTDR area 42 of the multiframe from the BTS master unit BTS(n). If the pattern is not found, the counter 48 is incremented by the "out of sync." pulse. This process continues until the pattern detector 52 detects the correct pattern. The counter 48 will then remain stable, and the multiframe from the BTS master unit BTS(n) in the superframe at the input to a shift register 56—this input coming from the 1-of-N decoder 46—will be aligned with the BTS multiframe bit clock. The data 54 at the output of the latch 50 is the multiframe from the BTS master unit BTS(n) containing the narrow band traffic.

The shift register 56 delays the aligned superframe by N bits, for input to a second 1-of-N decoder 58 which selects a delayed version of the aligned superframe depending upon a video channel selection address input 60. The delayed superframe is sampled at the multiframe bit clock rate by a latch 62 which selects a specific multi frame from one of the BTS master units BTS(1) to BTS(n-1). The selected multiframe is then transmitted to the video SUs.

In all cases, narrow bandwidth control channels can be provided over the existing BTS. For example, a single 64 kbit/s digital control channel would require no modifications to the existing BTS upstream arrangements. The BTS supports channels as low as 8 kbit/s, so there is scope for providing an asymmetric control signal service of, say, 2048+8 kbit/s in the downstream direction, with only 8 Kbit/s upstream.

At the ONU 2, the received superframed data is demultiplexed as described above. The BTS 20.48 MHz recovered data stream is fed to the BTS slave unit on the line 54 as if it came from a conventional electro-optics receiver. The remaining de-multiplexed video data is fed to the BTS slave unit 26 which sorts the video channels.

As an example, using a multiplex derived from the BTS data rate multiplied by 8 (that is to say where n=8), there would be sufficient capacity to transport a 140 Mbit/s multiplex in addition to the narrower bandwidth traffic carried by the BTS, i.e.:

| Rate (Mbit/s) | Source |
|---|---|
| 20.48 | BTS narrow bandwidth traffic |
| 139.264 | Wide bandwidth traffic |
| 4.096 | Superframing and control |
| Total 163.84 = | 20.48 × 8 |

While FIG. 3 represents one embodiment, the particular utility of the present invention derives from its implementation as an overlay on an existing voice/data TPON to carry wider bandwidth video or other information.

FIG. 7 illustrates such a TPON system overlay, in which a conventional voice/data system BTS master unit 70 receives and sends traffic in a conventional manner. The BTS master unit 70 is connected to the PON 18 through an electro-optics converter and multiplexer module 72. Two or more multiplexed VoD channels are applied to a pair of TUs 74, and are then combined in a multiplexer 76. The BTS channels are multiplexed together with the multiplexed video channels in the multiplexer module 72. The output from the multiplexer module 72 is transmitted downstream over the PON 18.

At the ONU 2, an electro-optics converter and demultiplexer module 78 receives the broadcast optical signal, and converts this to an electrical signal containing the superframe of narrow band and broadband overlay components. This superframe, generated by the electro-optics converter and multiplexer module 72, comprises three components— the original narrow band traffic, the broadband video overlay traffic, and a superframe synchronisation pattern. This superframe is demultiplexed to give two output signals—the original narrow band signal, which is routed to a narrow band transport module (a BTS slave unit) 84, and the broadband overlay multiplex, which is routed to a video channel demultiplexer 30, and hence to customer SUs 82. As with the embodiment of FIG. 3, the narrow band BTS slave unit 84 carries the control channel between the video source and the customer. The demultiplexer 80 is similar to the demultiplexer 22 described above with reference to FIG. 6, and uses a similar technique for demultiplexing.

Thus, the provision of VoD across a typical PON using BTS management requires the system bandwidth to be increased to make room for the additional data. The optical fibre network is able to support the increased bandwidth. The additional housekeeping capacity is available within the 4096 spare OTDR bits in the multiframe. Control of the video data is conveniently governed over a single unmodified 8 kbit/s upstream channel on the BTS network itself.

This technique involves minimal changes to existing equipment designs. In practice, new electro-optics cards are used to replace the existing cards to provide the wider bandwidth optics necessary to access the BTS multiplexer. By pre-multiplexing the video channels, and applying the multiplexed video data to the BTS multiplexer, the original multiplexer may be usable without upgrading, realising a further saving in line hardware modifications.

Recently, the maximum safe power output level for Class 3 lasers has been increased. There is more than enough scope to allow increased optical output to compensate for the lower noise margin which accompanies a wider bandwidth system for use with PONs.

Figure 8:
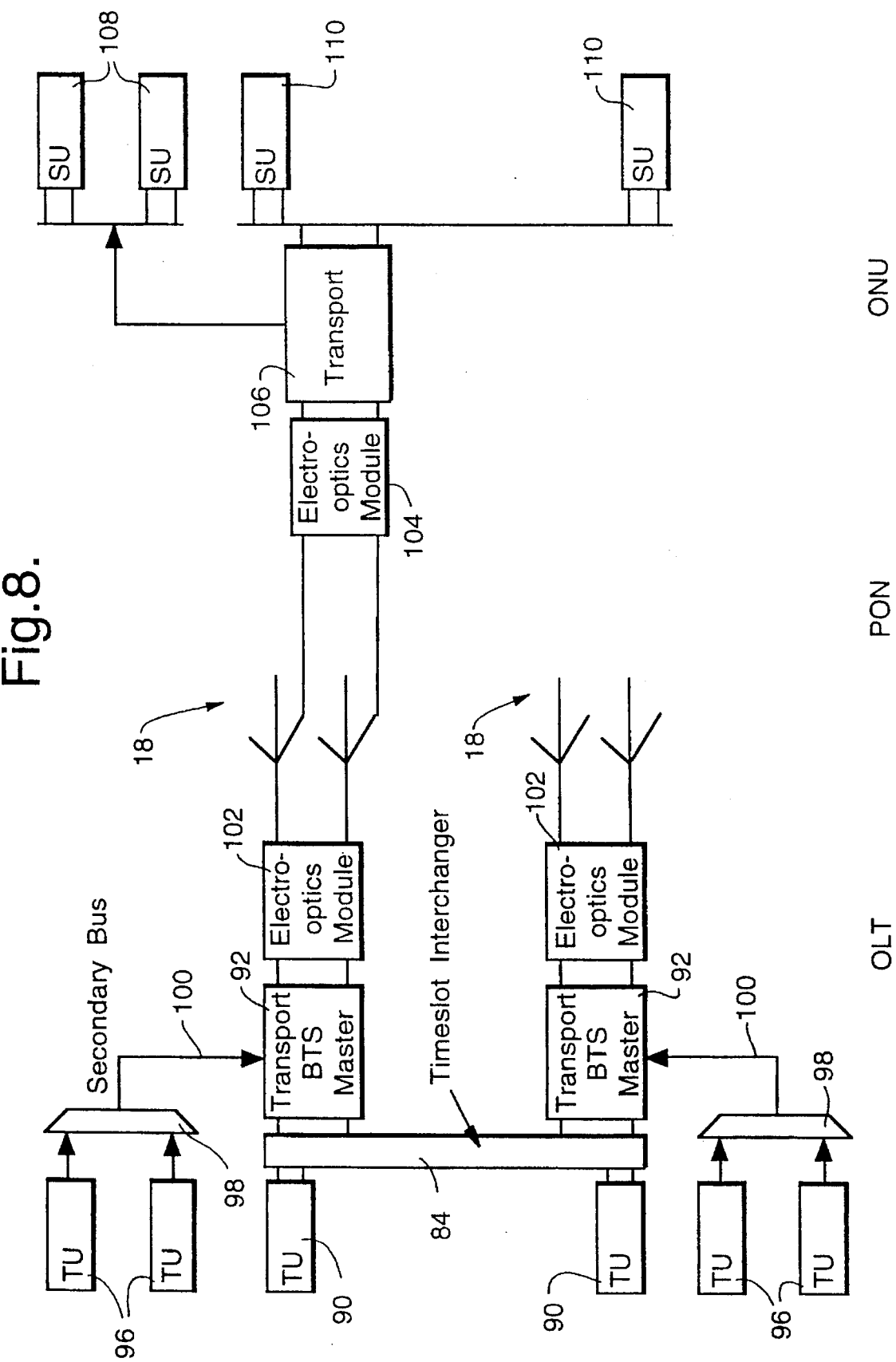
FIG. 8 is a schematic block diagram of a third embodiment of the invention.

While the invention is particularly attractive as a modification of an existing TPON system, the invention can be implemented as a dedicated network. An example is shown in FIG. 8 which shows voice/data TUs 90 of a transmission system, each TU being connected to an associated BTS master unit 92 through a timeslot interchanger 84. Each BTS master unit 92 is associated with its own PON 18, so that each the PONs can be connected to each of the TUs 90. Each of the BTS master units 92 is associated with respective further TUs 96 which are associated with VoD channels. The TUs 96 of each BTS master unit 92 are multiplexed together by a respective multiplexer 98 and are applied to that BTS master unit along a secondary bus 100. Each BTS master unit 92 multiplexes the incoming VoD channel bits with those from the TUs 90 to create the superframe for conversion by an electro-optics converter 102, and subsequent distribution across the respective PON 18. Of course, the system would, in practice, comprise a plurality of BTS master units 92, whereas only two are shown in FIG. 8. The BTS master units 92 may be arranged to carry wider bandwidth traffic, as shown, or conventional voice/data traffic.

At an ONU, the superframe is reconverted into an electrical signal in an electro-optic demodulator 104, and relayed to an appropriate BTS slave 106. The BTS slave 106 isolates the VoD channels, and demultiplexes then to be sent on to video customer SUs 108. The control signals for the VoD are, again, allocated an 8 kbit/s channel slot on the conventional upstream BTS managed network by means of one of a plurality of narrow band service units 110.

We claim:

1. A communications system comprising a line terminal connected via an optical network to a plurality of terminations, in which:

the line terminal includes means for receiving narrow bandwidth traffic and relatively wider bandwidth traffic, a plurality of terminal units each arranged to format traffic into frames, and a time division multiplexer arranged to receive one frame from each terminal unit and to interleave them into a superordinate frame for transmission over the optical network, one of the terminal units being arranged to generate a frame which includes a multiplexer synchronization sequence;

each termination comprises a time division demultiplexer for segregating received traffic into narrow bandwidth traffic and wide bandwidth traffic, each termination including means for synchronization in accordance with the synchronization sequence, and control means connected to each termination for generating narrow bandwidth control signals for transmission, using time division multiple access, to the line terminal;

and in which the line terminal is responsive to the control signals from a given termination to control the transmission of wide bandwidth traffic to that termination.

2. A communications system as claimed in claim 1 in which the terminal units comprise one or more first terminal units arranged to format the narrow bandwidth traffic and one or more second terminal units arranged to format the wider bandwidth traffic.

3. A communications system as claimed in claim 1 in which each terminal unit is arranged to format frames of identical format to those produced by the other terminal units.

4. A communications system as claimed in claim 1 in which the multiplexer and demultiplexer are arranged, respectively, to multiplex the frames into the superordinate frames and demultiplex the superordinate frames into frames, using bit-interleaving.

5. A communications system as claimed in claim 4 in which the demultiplexer includes a counter for selecting bits of one frame from the superordinate frame and a pattern detector for recognizing the demultiplexer synchronization sequence, the detector being arranged to advance the counter in the event of failure to recognize the sequence for a predetermined period.

6. A line terminal for a communications system including a plurality of terminations and an optical network for supporting traffic between the line terminal and the terminations, the line terminal comprising means for receiving narrow bandwidth traffic and relatively wider bandwidth traffic, a plurality of terminal units each arranged to format traffic into frames, and a time division multiplexer arranged to receive one frame from each terminal unit and to interleave them into a superordinate frame for transmission over the network, one of the terminal units being arranged to generate a frame which includes a multiplexer synchronization sequence and the line terminal being responsive to control signals from a given termination to control the transmission of wide bandwidth traffic to that termination.

7. A line terminal as claimed in claim 6 in which the terminal units comprise one or more first terminal units arranged to format the narrow bandwidth traffic and one or more second terminal units arranged to format the wider bandwidth traffic.

8. A line terminal as claimed in claim 6 in which each terminal unit is arranged to format frames of identical format to those produced by the other terminal units.

9. A communications system as claimed in claim 6 in which the multiplexer is arranged to multiplex the frames into the superordinate frames using bit-interleaving.

10. A termination for a communications system including a line terminal, a plurality of terminations and an optical network for supporting traffic between the line terminal and the terminations, wherein each termination comprises a time division demultiplexer for receiving superordinate frames each including an interleaved time multiplex of individual frames one of which contains a multiplexer synchronization sequence, said demultiplexer segregating received traffic into narrow bandwidth traffic and wide bandwidth traffic, means for synchronization of the demultiplexer to the synchronization sequence, and control means connected to each termination for generating narrow bandwidth control signals for transmission, using time division multiple access, to the line terminal for control of the transmission of wide bandwidth traffic to that termination.

11. A termination as claimed in claim 10 in which the demultiplexer is arranged to demultiplex the superordinate frames into frames using bit-interleaving.

12. A termination as claimed in claim 11 in which the demultiplexer includes a counter for selecting bits of one frame from the superordinate frame and a pattern detector for recognizing the demultiplexer synchronization sequence, the detector being arranged to advance the counter in the event of failure to recognize the sequence for a predetermined period.

13. A method of operating a communications network comprising a line terminal connected via an optical network to a plurality of terminations, the method comprising:

receiving, at a plurality of terminal units, narrow bandwidth traffic and relatively wider bandwidth traffic for transmission;

at each terminal unit, formatting the traffic into frames, the frames from one terminal unit containing a multiplexer synchronization sequence; multiplexing the frames by receiving one frame from each terminal unit and interleaving them into a superordinate frame; transmitting the superordinate frames over the network;

at the terminations, segregating the traffic into narrow bandwidth traffic and wide bandwidth traffic by means of a demultiplexer synchronized to the synchronization sequence; and transmitting narrow bandwidth control signals using time division multiple access, from a termination to the line terminal to control, at the line terminal, the transmission of wide bandwidth traffic to that termination.

14. A communications system comprising a line terminal connected via an optical network to a plurality of terminations, in which the line terminal includes means for receiving narrow bandwidth traffic and relatively wider bandwidth traffic, a plurality of terminal units each arranged to format traffic into frames, and a time division multiplexer arranged to receive one frame from each terminal unit and to interleave them into a superordinate frame for transmission over the network, one of the terminal units being arranged to generate a frame which includes a multiplexer synchronization sequence; and each termination comprises a time division demultiplexer for segregating received traffic into narrow bandwidth traffic and wide bandwidth traffic and including means for synchronization to said synchronization sequence.

* * * * *